US012678717B2

(12) United States Patent
Hinojosa Garcia et al.

(10) Patent No.: US 12,678,717 B2
(45) Date of Patent: Jul. 14, 2026

(54) FILTER DEVICE AND FUEL CELL SYSTEM HAVING A FILTER DEVICE

(71) Applicant: Robert Bosch GmbH, Stuttgart (DE)

(72) Inventors: David Manuel Hinojosa Garcia, Madrid (ES); Gonzalo Montero Blanco, Mostoles (ES); Julio Jose Tejedor Diago, Alcobendas (ES)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 18/564,694

(22) PCT Filed: Apr. 27, 2022

(86) PCT No.: PCT/EP2022/061207
§ 371 (c)(1),
(2) Date: Nov. 28, 2023

(87) PCT Pub. No.: WO2022/253494
PCT Pub. Date: Dec. 8, 2022

(65) Prior Publication Data
US 2024/0269584 A1 Aug. 15, 2024

(30) Foreign Application Priority Data

May 31, 2021 (EP) .................................... 21176840

(51) Int. Cl.
*B01D 29/23* (2006.01)
(52) U.S. Cl.
CPC .......... *B01D 29/23* (2013.01); *B01D 2201/02* (2013.01); *B01D 2201/0415* (2013.01)
(58) Field of Classification Search
CPC ................ B01D 29/23; B01D 2201/02; B01D 2201/0415; B01D 29/902; Y02E 60/50

USPC ...................................................... 210/497.01
See application file for complete search history.

(56) References Cited

U.S. PATENT DOCUMENTS 7,655,098 B2    2/2010   Shih et al.
2021/0001251 A1   1/2021   Nodomi et al.

FOREIGN PATENT DOCUMENTS

DE    102019121342 A1   2/2020
JP      S6448221 U    3/1989
WO     2017036878 A1   3/2017

OTHER PUBLICATIONS

Translation of Wildermuth (DE102019121342B4) (Year: 2021).*
Translation of International Search Report for Application No. PCT/EP2022/061207 dated Jun. 20, 2022 (2 pages).

* cited by examiner

*Primary Examiner* — Ekandra S. Miller-Cruz
(74) *Attorney, Agent, or Firm* — Michael Best & Friedrich LLP

(57) ABSTRACT

The invention relates to a filter device comprising a support structure which extends between a first end and a second end and which defines an interior space tapering from the first end to the second end, wherein the support structure has at the second end a flow body which protrudes into the interior space in the direction of the first end and tapers in the direction of the first end, and wherein the support structure has openings which connect the interior space in a fluidly conducting manner to an environment of the support structure. Furthermore, the filter device has a filter medium which is accommodated in the interior space of the support structure.

13 Claims, 3 Drawing Sheets

FILTER DEVICE AND FUEL CELL SYSTEM HAVING A FILTER DEVICE

BACKGROUND

The present invention relates to a filter device, in particular for a liquid medium, for example a cooling medium in a cooling circuit of a fuel cell system, as well as a fuel cell system having such a filter device.

Fuel cells are being increasingly used as energy converters, among other things in vehicles, in order to directly convert the chemical energy contained in a fuel, e.g. hydrogen together with oxygen, into electrical energy. Fuel cells typically comprise an anode, a cathode, and an electrolytic membrane located between the anode and the cathode. Oxidation of the fuel occurs at the anode, and a reduction of oxygen occurs at the cathode.

In the chemical reaction occurring in the fuel cell, heat is released, which is usually dissipated via a cooling circuit, in particular in order to prevent an overheating of the membrane and to improve the efficiency of the fuel cell.

WO 2017/036878 A1 and U.S. Pat. No. 7,655,098 B2 disclose cooling circuits for fuel cell systems in which a liquid cooling medium, such as deionized water, is circulated, wherein the cooling circuits each contain filter devices for filtering the cooling medium.

SUMMARY

According to the invention, a filter device and a fuel cell system are provided.

According to a first aspect of the invention, there is provided a filter device, in particular for a liquid medium, for example a cooling medium in a cooling circuit of a fuel cell system. The filter device comprises a support structure extending between a first end and a second end, which defines an interior space tapering from the first end towards the second end, and a filter medium accommodated in the interior space of the support structure. The support structure has at the second end a flow body protruding into the interior space towards the first end, which tapers towards the first end, wherein the support structure comprises openings which conductively connect the interior space to an environment of the support structure.

According to a second aspect of the invention, a fuel cell system, a fuel cell assembly having at least one fuel cell, and a cooling circuit thermally coupled to the fuel cell assembly, which is configured so as to circulate a coolant, wherein the cooling circuit comprises a filter device according to any one of the preceding claims in order to filter the coolant.

One idea underlying the invention is to configure the filter device with a shape that tapers in a first direction of flow in order to reduce a pressure drop created by the filter device. In particular, a mechanically robust support structure or shell is provided, which defines a port at a first end into which the coolant can flow in and at a second end comprises a flow or baffle body, which widens along the flow direction. This deflects the coolant in a radial direction and advantageously reduces turbulence and similar flow losses in the region of the second end of the support structure. At the same time, a reduction in losses can also be advantageously achieved in a second direction of flow counter to the first direction of flow.

Generally, the support structure can extend along a longitudinal axis, which preferably defines a central axis. The radial direction extends perpendicular to the central axis. The filter medium is arranged within the support structure with respect to the radial direction and is supported by it in the radial direction. This advantageously increases the pressure at which the filter device can operate, wherein damage to the filter medium by the support structure is prevented.

The filter medium is in particular suitable for filtering or separating particles from a fluid flow, extends between a first and a second end, and tapers towards the second end, preferably conically. The filter medium is thus housed in the interior of the support structure such that the second end of the filter medium faces the second end of the support structure and the first end of the filter medium faces the first end of the support structure. In this way, the support structure can be produced particularly simply, e.g. by shaping it around the filter medium, e.g. in a casting process or a 3D printing process.

Advantageous configurations and further developments emerge from the dependent claims and from the description with reference to the figures.

According to some embodiments, it can be provided that the support structure is conical in form. In particular, the interior space can conically extend about a central axis, wherein the flow body is arranged coaxially to the central axis. The conical shape is advantageous in order to further reduce flow losses. Furthermore, manufacturing of the filter device is facilitated.

According to some embodiments, the flow body can be conical in form. In particular, a tip of the flow body faces the first end of the support structure. Thus, if the support structure itself is conical, the cone of the flow body is oriented inversely to the cone of the support structure.

According to some embodiments, it can be provided that the support structure comprises an end frame forming the first end, an end body forming the second end, and at least two longitudinal struts, which are arranged spaced apart from one another on the frame and connect the end body and the end frame, wherein the openings are formed between the longitudinal struts. The support structure is thus realized as a type of scaffolding. The end frame defines a port and can be annular, for example. The end body can in particular form a tip of the support structure. The flow body is preferably formed integrally with the end body. The end body can also be realized as a cone, for example. The longitudinal struts are spaced apart relative to a circumferential direction extending around the central or longitudinal axis and can also be formed integrally with the end body and/or the end frame. The openings are in this case formed by the areas between the longitudinal struts. An advantage of the scaffolding design is that it is mechanically robust, and large openings are formed so that the flow loss through the filter device is further reduced.

According to some embodiments, it can be provided that the support structure comprises at least one circumferential strut arranged between the end frame and the end body, which connects the longitudinal struts to one another, wherein the openings are formed between the longitudinal struts and the circumferential struts. Thus, in addition to the longitudinal struts, one or more circumferential struts can be provided that extend transversely to the longitudinal struts, wherein each circumferential strut connects at least two longitudinal struts. For example, the circumferential struts can be configured as annular or generally closed frames that completely enclose the center axis or longitudinal axis. Due to the circumferential struts, the openings are thus configured as windows between the longitudinal and circumferential struts. One advantage of the circumferential struts is that the support structure mechanically becomes even more robust and thus the working pressure of a cooling system or generally the medium directed through the filter can be further increased.

According to some embodiments, it can be provided that the support structure is made from a plastic material, in particular a thermosetting plastic material, a thermoplastic plastic material, or a fiber-reinforced plastic material. In this way, the support structure can be manufactured very simply, e.g. in an injection molding process or additive manufacturing process, such as 3D printing.

According to some embodiments, the filter device comprises a conduit body protruding into the interior of the support structure at the first end, which defines a flow passage extending between an inlet port and an outlet port, wherein the outlet port faces the interior of the support structure; and wherein the flow passage comprises an outlet section that widens towards the outlet port, in particular conically. The flow passage can in particular protrude into the support structure, wherein cross-sectional jumps along the flow path and thus pressure losses are reduced in an efficient and simple manner by the flaring flow cross-section in the outlet section of the flow passage.

According to some embodiments, it can be provided that the flow passage comprises a supply section extending, in particular cylindrically, with a constant flow cross-section, and wherein the outlet section adjoins the supply section. Simple geometric structures are thus realized that are easily produced. For example, the supply section can extend from the inlet port, wherein the outlet port extends from an end of the supply section facing away from the inlet port and ending at the outlet port.

According to some embodiments, it can be provided that the filter device comprises a housing defining a receiving space extending between a first port and a second port, wherein the support structure is accommodated in the receiving space such that the first end of the support structure faces the first port. The optional conduit body can optionally be connected to the housing, e.g. in the region of the first port, and can extend through or protrude into the first port. The housing thus forms a conduit section for routing cooling medium.

BRIEF DESCRIPTION OF THE DRAWINGS

The invention will be explained in the following with reference to the figures of the drawings. The figures show.

DETAILED DESCRIPTION

Unless otherwise stated, the same reference numbers refer to like or functionally identical components shown in the figures.

Figure 1:
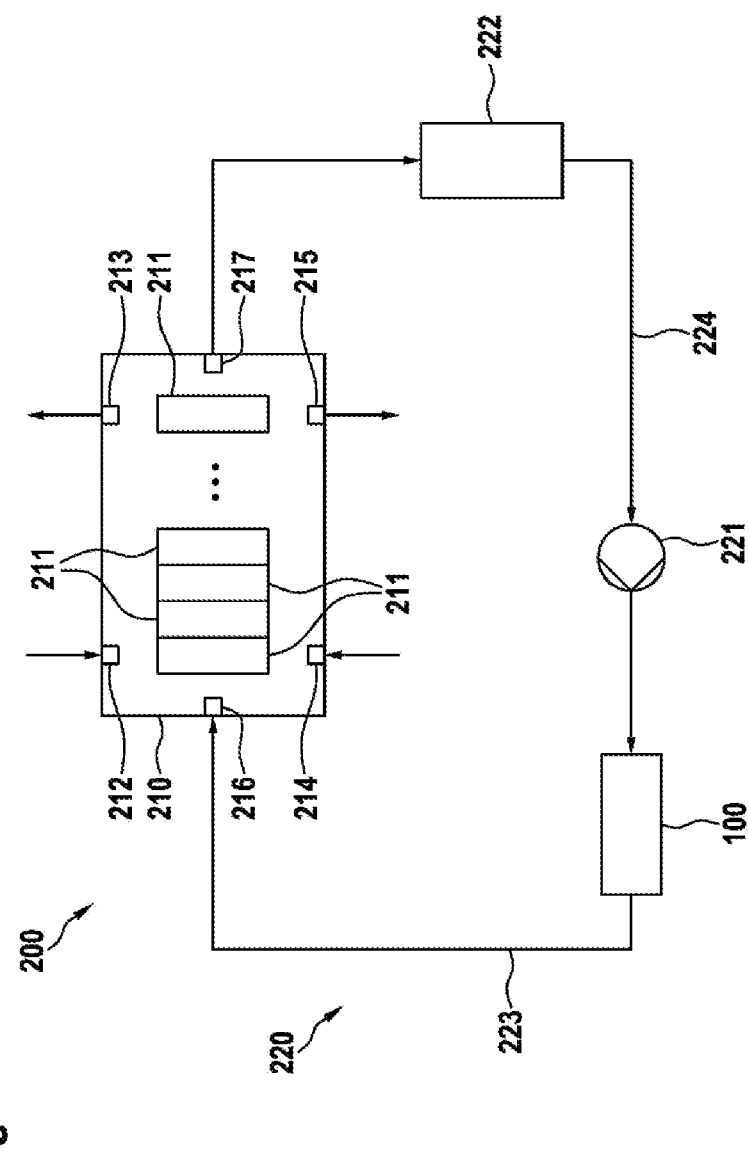
FIG. 1 a schematic view of a hydraulic diagram of a fuel cell system according to an embodiment example of the invention.

FIG. 1 schematically shows a fuel cell system 200. The fuel cell system 200 comprises a fuel cell assembly 210 and a cooling circuit 220 for cooling the fuel cell assembly 210.

As shown schematically in FIG. 1, the fuel cell assembly 210 can include a plurality of fuel cells 211, which can be built into a so-called stack, for example. Generally, the fuel cell assembly 210 comprises at least one fuel cell 211. Each fuel cell 211 comprises a cathode (not shown), an anode (not shown), and an electrolyte (not shown) arranged between the cathode and the anode, e.g. in the form of a membrane. The fuel cell assembly 210 is configured so as to generate electrical energy upon a supply of fuel, such as hydrogen, to the anode and a supply of oxygen to the cathode. Oxidation of the fuel occurs at the anode, and a reduction of oxygen occurs at the cathode. As shown schematically in FIG. 1, the fuel cell assembly 211 can include a fuel supply connector 212 for supplying fuel to the anode and a fuel discharge connector 213 for removing unreacted fuel from the anode. Furthermore, the fuel cell assembly 211 can comprise an oxygen supply connector 214 for supplying fuel to the cathode and an oxygen discharge connector 215 for removing the reaction products from the cathode.

The coolant circuit 220 is shown merely schematically in FIG. 1 and is used in order to circulate a refrigerant or cooling medium that exchanges heat with the fuel cell assembly 210. As exemplified in FIG. 1, the coolant circuit 220 can comprise a pump or a compressor 221, a filter device 100, and a heat exchanger 222.

The compressor 221 is configured so as to convey the cooling medium. The cooling medium can be gaseous or liquid. For example, deionized water or other liquid can be used as the cooling medium. A pressure output of the compressor 221 is fluidly connected to a coolant inlet 216 of the fuel cell assembly 210, e.g. through a supply line 223. A suction inlet of the compressor 222 is fluidly connected to a coolant outlet 217 of the fuel cell assembly 210, e.g. via a suction conduit 224.

As shown schematically in FIG. 1, the heat exchanger 222 is arranged between the suction inlet of the compressor 222 and the coolant outlet 217 such that coolant coming from the fuel cell assembly 210 can be fed thereto by the suction conduit 224. The heat exchanger 222 is coupled to a heat sink, such as the environment, in order to draw heat from the coolant. Thus, coolant can be supplied to the fuel cell assembly 210 by the compressor 221 and heat can be removed from the fuel cell assembly 210, wherein heat is again removed from the coolant in the heat exchanger 222. In the fuel cell assembly 210, for example, the coolant can be directed in a passage assembly (not shown) thermally conductively connected to the fuel cells 211. Generally, the refrigerant circuit 210 is thermally coupled to the fuel cell assembly 210.

The filter device 100 can in particular be arranged between the pressure output of the compressor 221 and the coolant inlet 216 of the fuel cell assembly 210, e.g. in the supply conduit 223, as shown purely by way of example in FIG. 1. However, it is also generally contemplated that the filter device 100 is arranged between the suction inlet of the compressor 222 and the coolant outlet 217, e.g. in the suction conduit 223. The filter device 100 is used in particular for separating or filtering particles that can be present in the coolant. For example, wear in various components of the coolant circuit, such as the compressor 221, valves (not shown), or the heat exchanger 222, can loosen particles that are transported by the coolant and can thereby enter the fuel cell assembly 210.

Figure 2:
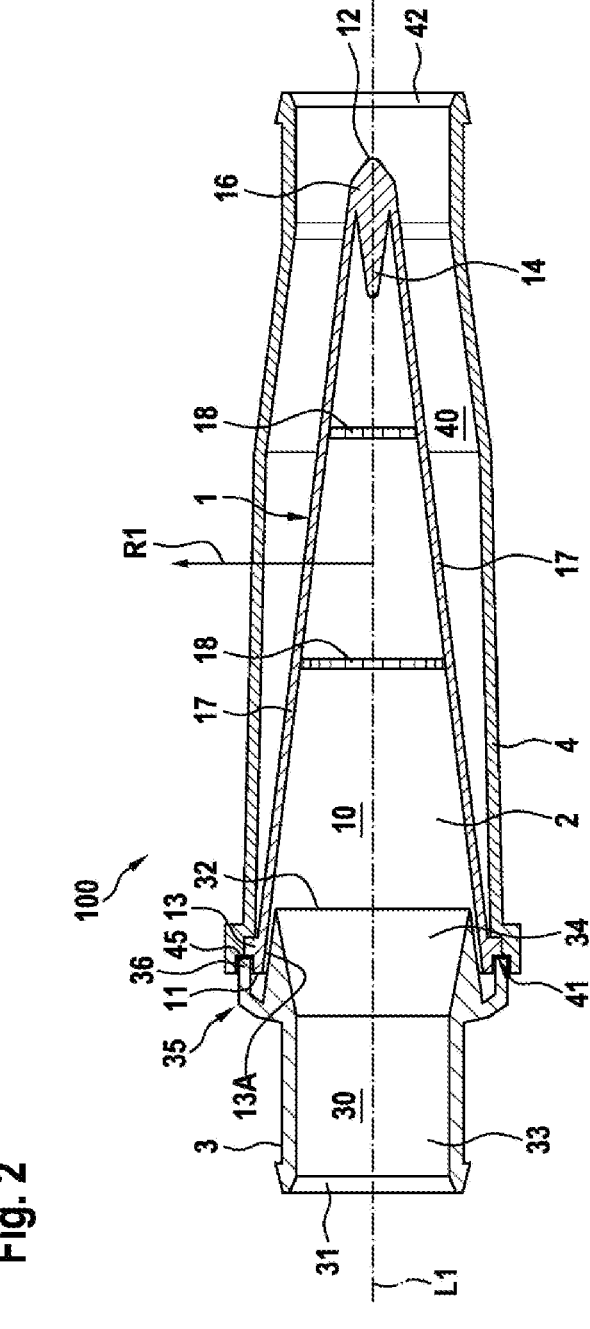
FIG. 2 a schematic sectional view of a filter device according to an embodiment example of the invention.
Figure 3:
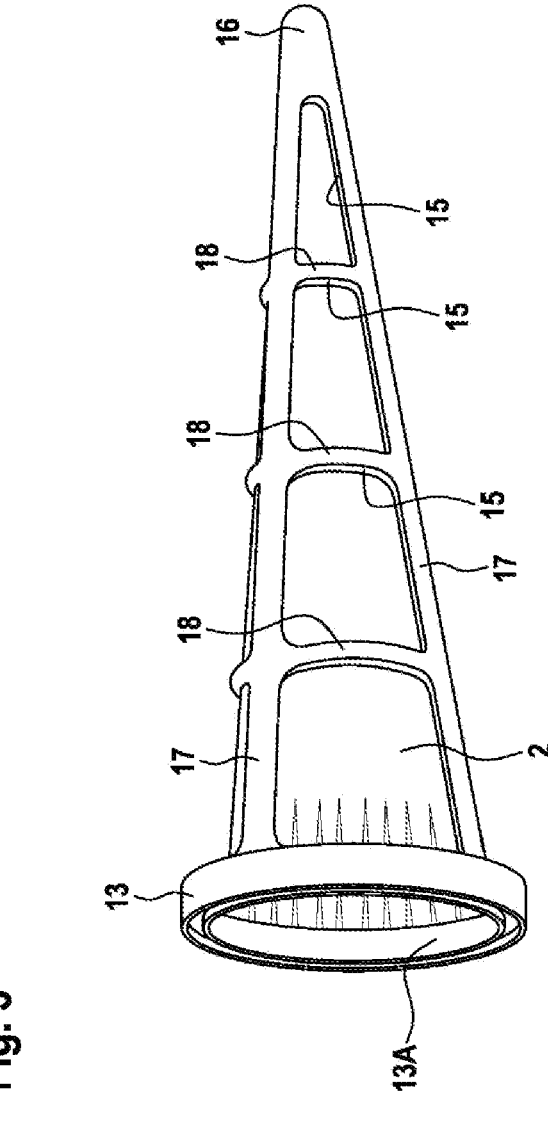
FIG. 3 a perspective view of a filter device according to an embodiment example of the invention.

FIG. 2 illustrates a purely exemplary sectional view of the filter device 100. FIG. 3 shows the filter device 100 of FIG. 2 in a perspective view without an optional conduit body 3 and without an optional housing 4.

As exemplified in FIG. 2, the filter device 100 has a support structure 1 and a filter medium 2. As mentioned, a conduit body 3 can optionally additionally be provided. Likewise, FIG. 2 shows that the filter device 100 can comprise an optional housing 4.

As exemplified in FIGS. 2 and 3, the support structure 1 can in particular comprise an end frame 13, an end body, or an end piece 16 and at least two longitudinal struts 17. As shown in FIG. 2, the support structure 1 comprises a flow body 14. Further optionally, one or more transverse struts 18 can be provided, as exemplified in particular in FIG. 3.

For example, the end frame 13 can be annular, as exemplified in FIG. 3, but is not limited to this shape. Generally, the end frame 13 can be a closed frame defining a port 13A. The end frame 13 forms a first end 11 of the support structure 1 with respect to a longitudinal axis L1. The end frame 13 can in particular be formed from a plastic material, e.g. a thermosetting plastic, a thermoplastic plastic material, or a fiber-reinforced plastic material.

The end body 16 is arranged along the longitudinal axis L1 spaced apart from the end frame 13, as exemplified in FIG. 2, and forms a second end 12 of the support structure 1 with respect to the longitudinal axis L1. As exemplified in FIG. 2, the end body 16 can have a substantially triangular or trapezoidal cross-section. Optionally, the longitudinal axis L1 extends through a centroid of the port 13A defined by the end frame 13 and through the end body 16, as shown purely by way of example in FIG. 2. As further shown in FIG. 2, the end body 16 has a smaller diameter or extension than the end frame 13 relative to a radial direction R1 extending perpendicular to the longitudinal axis L1. The end body 16 can in particular be formed from a plastic material, e.g. a thermosetting plastic, a thermoplastic plastic material, or a fiber-reinforced plastic material.

As further shown schematically in FIGS. 2 and 3, the longitudinal struts 17 extend between the end frame 13 and the end body 16 and connect the end body 16 and the end frame 13. The longitudinal struts 17 can be realized bars or rods that extend straight, for example. Alternatively, it is also contemplated that the longitudinal struts 17 extend helically around the longitudinal axis L1 between the end frame 13 and the end body 16. The longitudinal struts 17 are arranged spaced apart from one another, in particular with respect to a circumferential direction enclosing the longitudinal axis L1. Because the end body 16 has a smaller diameter than the end frame 13 with respect to the radial direction R1, the longitudinal struts 17 limit an interior space 10 which tapers from the first end 11 to the second end 12 of the support structure 1. If the end frame 13 is annular as in FIG. 1, a tapered support structure 1 will result. Alternatively, other tapering shapes are conceivable, such as a pyramid shape or pyramid stump. The clearances resulting in relation to the circumferential direction between the longitudinal struts 17 form openings 15 from the interior space 10 to an environment that is exterior in relation to the radial direction R1.

The circumferential struts 18 are arranged between the first and second ends 11, 12 and extend along the circumferential direction between or connect at least two adjacent longitudinal struts 17 to one another. Optionally, the circumferential struts 18, as exemplified in FIG. 3, can extend around the entire circumference or can enclose the longitudinal axis L1. If more than one circumferential strut 18 are provided, e.g. three circumferential struts 18, as exemplified in FIG. 3, they are arranged spaced apart from one another along the longitudinal axis L1 and can extend parallel to one another, for example. The openings 15 are thus configured as windows between the longitudinal struts 17 and the circumferential struts 18.

The longitudinal struts 17 and the circumferential struts 18 can in particular be formed from a plastic material, such as a thermosetting plastic, a thermoplastic plastic material, or a fiber-reinforced plastic material. Optionally, the longitudinal struts 17, and possibly the optional circumferential struts 18, of the end frame 13 and the end body 16, are formed integrally or manufactured in one piece.

The support structure 13 is not limited to the design with longitudinal and transverse struts 17, 18 as described in FIGS. 2 and 3. For example, the support structure 13 can also comprise a tapered sleeve body extending in a planar manner around the longitudinal axis L1 with a plurality of apertures or ports. The support structure 1 thus generally extends between a first end 11 and a second end 12 and defines an interior space 10 that tapers from the first end 11 towards the second end 12.

As can be seen in FIG. 2, the flow body 14 is arranged at the second end 12 of the support structure 1 and protrudes into the interior space 10. In particular, the flow body 14 can be arranged coaxially to the longitudinal axis L1, as exemplified in FIG. 2. The flow body 14 is formed as a body tapering towards the first end 11. For example, the flow body 14 can be conical, as exemplified in FIG. 2. Furthermore, it can be seen in FIG. 2 that the flow body 14 extends from the end body 16 and ends while spaced apart from the first end 11, for example spaced apart from the end frame 13. For example, the flow body 14 in the interior space 10 can have an extension along the longitudinal axis L1, which lies in a range between 10 percent and 20 percent of an extension of the support structure 1 along the longitudinal axis L1 between the first end 11 and the second end 12. For example, the flow body 14 can be formed integrally with the end body 16, in particular from a plastic material as described above for the end body 16.

The filter medium 2 is shown partially transparent in FIG. 2 and can be realized as a hollow body extending between a first end 21 and a second end 22, which tapers from the first end to the second end 22. For example, the filter medium 2 can be configured in terms of its shape so as to match the interior space 10 of the support structure 1. It is shown by way of example in FIG. 2 that the filter medium 2 is formed as a conical hollow body. For example, the filter medium 2 can be porous or perforated and is generally permeable to liquid and/or gaseous fluids.

As shown schematically in FIGS. 2 and 3, the filter medium 2 is accommodated in the interior space 10 of the support structure 1, wherein the first end 21 of the filter medium 2 is arranged in the region of the first end 11 of the support structure 1 and the second end 21 of the filter medium 2 is arranged in the region of the second end 12 of the support structure 1. The first end 21 of the filter medium 2 can be attached to the end frame 13, for example. The second end 22 of the filter medium 2 can, for example, comprise a port through which the flow body 14 of the support structure 1 protrudes. The filter medium 2 can optionally also be attached to the longitudinal struts 17 and/or the transverse struts 18.

As exemplified in FIG. 2, the optional conduit body 3 can be realized as a pipe piece. Generally, the conduit body 3 defines a flow passage 30 extending between an inlet port 31 and an outlet port 32. As exemplified in FIG. 2, the flow passage 30 can comprise a first section or supply section 33 extending from the inlet port 31 and a second section or outlet section 34 connecting the first section 33 to outlet port 32. The first section or supply section 33 can in particular have a constant flow cross-section or diameter. For example, the supply section 33 can be cylindrical or rectangular. The second section or outlet section 34 can have a flow cross-section or diameter that widens toward the outlet port 32. For example, the outlet section 34 can be conical or pyramidal in form. Instead of a supply section 33 with a constant flow cross-section, the flow passage 30 can also continuously widen from the inlet port 31 towards the outlet port 32. Generally, the flow passage 30 thus has at least one outlet section 34 which widens towards the outlet port 32.

As shown schematically in FIG. 2, the outlet section 34 or outlet port 32 faces the support structure 1 and protrudes into the interior space 10 of the support structure 1 at the first end 11. In particular, the conduit body 3 extends through the port 13A of the end frame 13 into the cavity circumscribed by the filter medium 2. Thus, fluid can be transported into and out of the interior space 10 through the flow passage 30. The second section 34, which widens towards the outlet port 32, advantageously reduces flow losses.

As further shown by way of example in FIG. 2, the optional housing 4 defines a receiving space 40 extending between a first port 41 and a second port 42. The housing 4 can in particular be realized as a pipe piece, as exemplified in FIG. 2. The support structure 1 is accommodated in the receiving space 40 of the housing 4. As shown in FIG. 2, the first end 11 of the support structure 1 is located facing the first port 41, or the first end 11 of the support structure 1 can be located facing the first port 41. As shown schematically in FIG. 2, an outer circumference of the support structure 1, e.g. the end frame 13, can be connected to an inner circumference of the housing 4, e.g. welded to, glued to, or latched to the latter.

As is also illustrated schematically and purely by way of example in FIG. 2, the conduit body 3 can have a connection structure 35 configured on its outer periphery, which can be arranged, for example, in the area of the outlet section 34. For example, the connection structure 35 can be a collar 36 protruding from the outer circumference and extending along the longitudinal axis L1. As exemplified in FIG. 2, the collar 36 can be accommodated in a gap 45 formed with respect to the radial direction R1 between the first end 11 of the support structure 1, e.g. between a section of the end frame 13, and the housing 4 in the region of the first port 41. There, the collar 36 can be, for example, latched, glued, welded, or otherwise fastened. The conduit body 3 can generally be connected to the support structure 1 and/or the housing 4.

Although the present invention has been explained above with reference to embodiment examples, the invention is not limited thereto and can instead be modified in a variety of ways. Combinations of the above embodiment examples are in particular also conceivable. Furthermore, the filter device described is not limited to use in cooling circuits of fuel cell systems, but can generally be used as a filter, in particular as a particulate filter, in flow channels, for filtering both liquid and gaseous media.

The invention claimed is:

1. A filter device (100) for a liquid medium, the filter device comprising:
   a support structure (1) which extends between a first end (11) and a second end (12) and which defines an interior space (10) tapering from the first end (11) to the second end (12), wherein the support structure (1) has at the second end (12) a flow body (14) which protrudes into the interior space (10) in a direction of the first end (11) and tapers in the direction of the first end (11), and wherein the support structure (1) has openings (15) which connect the interior space (10) in a fluidly conducting manner to an environment of the support structure (1);
   a filter medium (2) which is accommodated in the interior space (10) of the support structure (1); and a conduit body (3) protruding into the interior space (10) of the support structure (1) at the first end (11) and defining a flow passage (30) extending between an inlet port (31) and an outlet port (32);
   wherein the outlet port (32) faces the interior space (10) of the support structure (1); and
   wherein the flow passage (30) comprises an outlet section (34) which widens towards the outlet port (32).

2. The filter device (100) according to claim 1, wherein the support structure (1) is conical in form.

3. The filter device (100) according to claim 1, wherein the flow body (14) is conical in form.

4. The filter device (100) according to claim 1, wherein the support structure (1) comprises an end frame (13) forming the first end (11), an end body (16) forming the second end (12), and at least two longitudinal struts (17) arranged spaced apart from one another on the frame, which connect the end body (16) and the end frame (13), wherein the openings (15) are formed between the longitudinal struts (17).

5. The filter device (100) according to claim 4, wherein the support structure (1) comprises at least one circumferential strut (18) arranged between the end frame (13) and the end body (16), which connects the longitudinal struts (17) to one another, wherein the openings (15) are formed between the longitudinal struts (17) and the at least one circumferential strut (18).

6. The filter device (100) according to claim 1, wherein the support structure (1) is made from a plastic material.

7. The filter device (100) according to claim 1, wherein the flow passage comprises a supply section (33) extending with a constant flow cross-section, and wherein the outlet section (34) connects to the supply section (33).

8. The filter device (100) according to claim 1, additionally comprising:
   a housing (4) defining a receiving space (40) extending between a first port (41) and a second port (42);
   wherein the support structure (1) is accommodated in the receiving space (40) such that the first end (11) of the support structure (1) faces the first port (41).

9. A fuel cell system (200) comprising:
   a fuel cell assembly (210) having at least one fuel cell (211); and
   a cooling circuit (220) thermally coupled to the fuel cell assembly (210) and configured so as to circulate a coolant, wherein the cooling circuit (220) comprises a filter device (100) according to claim 1 to filter the coolant.

10. The filter device (100) according to claim 1, wherein the liquid medium is a cooling medium in a cooling circuit (220) of a fuel cell system (200).

11. The filter device (100) according to claim 6, wherein the plastic material is a thermosetting plastic material, a thermoplastic plastic material, or a fiber-reinforced plastic material.

12. The filter device (100) according to claim 1, wherein the outlet section (34) widens in a tapered manner towards the outlet port (32).

13. The filter device (100) according to claim 7, wherein the supply section (33) is cylindrical.

* * * * *